United States Patent [19]

Yanagi et al.

[11] Patent Number: 5,046,812
[45] Date of Patent: Sep. 10, 1991

[54] APPARATUS AND METHOD FOR JOINING COATED OPTICAL FIBERS BY FUSION

[75] Inventors: Tooru Yanagi; Yasuo Asano, both of Kanagawa, Japan

[73] Assignee: Sumitomo Electric Industries Ltd., Osaka, Japan

[21] Appl. No.: 450,453

[22] Filed: Dec. 14, 1989

[30] Foreign Application Priority Data

Jan. 23, 1989 [JP] Japan .................................. 1-14638

[51] Int. Cl.$^5$ ...................... G02B 6/38; C03B 25/00; H05B 7/18
[52] U.S. Cl. .......................................... 385/96; 65/4.2; 65/12; 219/384; 219/121.2; 385/98
[58] Field of Search ............ 350/96.10, 96.15, 96.20, 350/96.21, 96.22, 320; 219/383, 384, 121.19, 121.2; 65/4.1, 4.2, 3.1, 3.11, 12, 36; 427/163

[56] References Cited

U.S. PATENT DOCUMENTS

| 4,512,629 | 4/1985 | Hanson et al. | 350/96.30 |
| 4,727,237 | 2/1988 | Schantz | 350/96.21 |
| 4,957,343 | 9/1990 | Sato et al. | 350/96.21 |
| 4,962,988 | 10/1990 | Swann | 350/96.21 X |
| 4,964,694 | 10/1990 | Oohashi et al. | 350/96.33 |

Primary Examiner—Brian Healy

[57] ABSTRACT

An arrangement for effectively fusing together two optical fibers. Many fibers currently have a carbon-based coating applied to the bare fiber, with the coating being surrounded by a plastic jacket. It has been difficult to fuse the two fibers together due to the coating. The present invention provides an effective method for removing the coating using a rapid and high temperature electric discharge. The removal of the coating allows a better connection of the two fibers with the connection having a low transmission loss.

8 Claims, 3 Drawing Sheets

APPARATUS AND METHOD FOR JOINING COATED OPTICAL FIBERS BY FUSION

BACKGROUND OF THE INVENTION

1. Field of the Invention

The present invention relates to a method by which two optical fibers, each including a bare fiber surrounded by a thin coating layer made of a carbon-based material such as titanium carbide or silicon carbide which in turn is covered with a jacket, are joined together by fusion.

2. Description of the Prior Art

FIG. 3(a) shows a conventional optical fiber 20. FIG. 3(b) shows the optical fiber 20 with the end of its jacket 22 removed to expose the bare fiber 21.

As shown in FIG. 3(b), a conventional method of joining two optical fibers having the construction described above comprises removing the end of each jacket 22 to expose the bare fiber 21, wiping dust particles and any other foreign matter from the bare fiber, making the ends of the bare fibers face each other, achieving optical alignment between the cores 21' of the fibers 20 by image processing, and fusing them together by the heat of an electric air discharge.

Optical alignment could be achieved conveniently by matching the outside diameters of optical fibers 20. However, if the core 21' of one of the optical fibers 20 is off-centered, the resulting joint will be as shown in FIG. 4(a).

An optical signal transmitted through the core 21' will be scattered thereby incurring excessive loss.

If, on the other hand, two optical fibers 20 with eccentric cores are joined together with the cores 21' being aligned by means of a direct core viewing fusing splicer, the resulting joint will be as shown in FIG. 4(b). There is a slight mismatch between the circumferences of the two optical fibers but their cores are in complete alignment so as to minimize the loss at the joint.

Recent advances in optical fiber technology have led to the development of high-quality optical fibers that have stable transmission characteristics and improved long-term reliability of their mechanical strength.

FIG. 5(a) and 5(b) show an example of such an improved optical fiber 10. FIG. 5(b) shows the optical fiber with the jacket removed at the end thereof. As shown, a bare optical fiber 11 is surrounded by a thin coating layer 12 having a thickness of 250–1000 Å which is made of a carbon based material such as titanium carbide or silicon carbide, which in turn is covered with a jacket 13 made of a material such as plastic.

Unlike the optical fiber 20 shown in FIG. 3, the optical fiber 10 has the carbon-based thin coating layer 12 formed on the circumference of the bare fiber 11. This is remarkably effective in preventing both changes in the chemical or physical properties of the optical fiber and the deterioration of the fiber's mechanical strength.

However, if one attempts to join two optical fibers 10 having the carbon-based thin coating layer 12 by means of a direct core viewing fusion splicer without incurring excessive loss at the joint, the following problems occur. The first problem is associated with the operating principle of the direct core viewing fusion splicer. To operate this machine, the ends of the bare optical fibers 11 to be joined are brought face-to-face with one another and light is projected from the lateral side of each fiber. The transmitted light produces a boundary between the bare optical fiber 11 and the core 11' on account of the difference between their refractive indices. The image of the boundary is observed on a CRT as shown in FIG. 6(a) so as to achieve axial alignment between the cores of the two optical fibers. However, the optical fiber 10 having the carbon-based thin coating layer 12 does not permit transmission of the incident light and the limits of the core 11' cannot be discerned. The resulting image on the CRT will be as shown in FIG. 6(b). Thus, the proper joint cannot be produced.

Secondly, it is possible to join two optical fibers 10 by means of a direct core viewing fusion splicer if the two fibers are forced into alignment with respect to their circumference. In this case, though, the following two problems will arise. First, when the ends of the two optical fibers are placed face-to-face with one another are fused together by electric discharge, a part of the carbon-based thin coating layer 12 will char from the heat of discharge and get into the fused ends of the optical fiber, potentially causing an increased transmission loss and deterioration of strength at the joint. Secondly, the core 11' may be off-centered with respect to the circle defined by the circumference of the bare fiber 11. In the sense of such eccentricity, a low-loss joint can not be ensured even if the circumference of one fiber is aligned with that of the other fiber.

SUMMARY OF THE INVENTION

Therefore, an object of the present invention is to provide a method by which two optical fibers, each including a bare fiber surrounded by a carbon-based thin coating layer which in turn is covered with a jacket, are joined together by fusion. The method comprises removing the jacket at the ends of the fibers to be joined, applying instantaneous heat in the range 500–1000° C. to the tips of the exposed carbon-based thin coating layers so as to remove them by thermal decomposition, bringing the ends of the exposed fibers into axial alignment, and fusing them together by the heat of electric air discharge.

Seeking to develop means for solving the aforementioned problems, the present inventors conducted studies on (1) an appropriate source of light that could be transmitted by the carbon-based thin coating layer and (2) a method for removing the carbon-based thin coating layer without damaging the bare optical fiber. The research on the first point showed that the optical fiber coated with a carbon-based thin layer transmitted only 20–21% of incident light in the wavelength range from ultraviolet, 200 Å, to infrared, 1000 Å, radiation and thus was incapable of allowing the core to be discerned. In studying the second point, the inventors prepared the ends of the optical fibers as in common methods of fiber splicing and then strongly rubbed the surface of the thin coating layer with a cloth impregnated with solvents such as alcohol, acetone and dichloromethane. This technique, however, was not able to remove the coating layer. The result was the same even when the fiber was immersed in solvents for a prolonged period, followed by application of ultrasonic waves.

These results showed that the thin coating layer could not be removed by either mechanical or chemical methods. In their continued studies, however, the present inventors reached the idea of removing the carbon-based thin coating layer by heat. This conclusion was reached due to the fact that the coating layer was formed by heat treatment. In developing an effective method for thermally removing the carbon-based thin coating layer from the surface of a bare fiber, the present inventors reviewed the temperature range for thermal decomposition of the coating material, the time of heat application and the method of heating. As a result, it was discovered that the thin coating layer could successfully be removed by thermal decomposition initiated by applying a given amount of heat to the end of the coating layer from a power source of electric discharge in a fusion splicer, with the time and power of an electric arc being properly controlled.

DETAILED DESCRIPTION OF THE PRESENTLY PREFERRED EXEMPLARY EMBODIMENT

Figure 1:
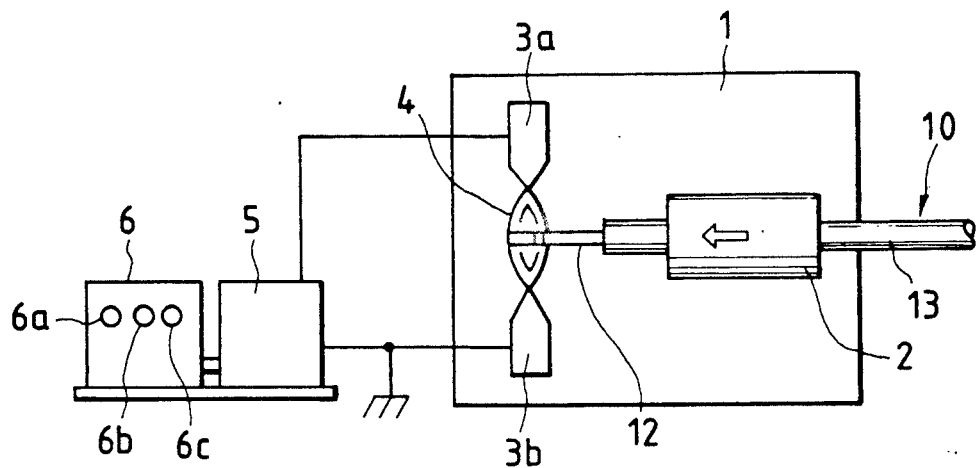
FIG. 1 shows a diagram of the mechanical setup for implementing the method of the present invention.

The method of the present invention for splicing optical fibers by fusion is described with reference to FIGS. 1 and 2. The steps shown in FIG. 2 are described below:

(1) Remove the jacket 13 from the end of an optical fiber 10 to expose the thin coating layer 12. The exposed end is adjusted to a length of about 10 mm by cutting the fiber. The optical fiber 10 with the partly removed jacket 13 is set in an optical fiber holder 2 as shown in FIG. 1, with the fiber tip being positioned halfway between a pair of opposing electrode rods 3a and 3b.

(2) Second, as depicted in FIG. 1, a discharge switch 6a on a discharge control apparatus 6 is turned on so that a discharge power source 5 applies a voltage between the electrodes 3a and 3b to generate an electric arc 4. Because of the heat of discharge, the tip of the thin coating layer 12 is rapidly heated to a temperature of 500–1000° C. and thermally decomposed away.

The discharging current that flows between the electrodes 3a and 3b varies slightly with the coating material and the thickness of the coating layer and is adjusted by a current control 6b and a discharge time setting switch 6c on the apparatus 6. In an experiment conducted by the inventors, the thin coating layer 12 could be satisfactorily removed with a discharging current of 13–15 mA and a discharge time of 0.2 seconds whether the coating layer was made of silicon carbide or titanium carbide.

Figure 2A:
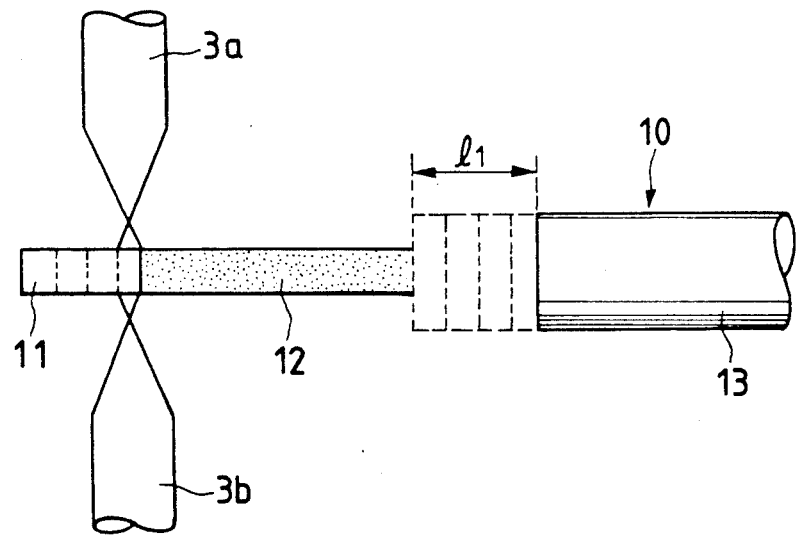
FIGS. 2(a)-2(e) depict the sequence of step for the method of the present invention.
Figure 2B:
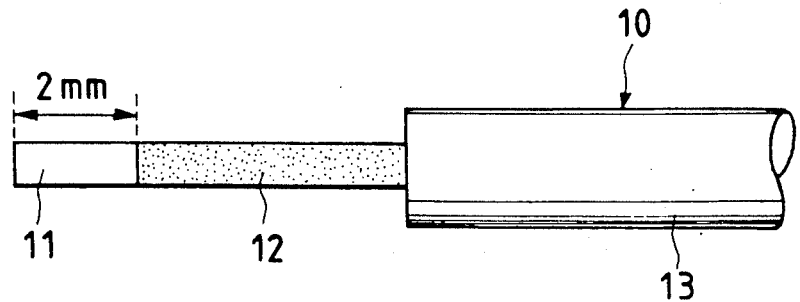

(3) A single discharge is capable of removing the thin coating layer 12 by a length of 0.3–0.4 mm. Thus, after the first discharge, the fiber holder 2 is moved by a length of about 0.30–0.4 mm in the direction indicated by the arrow and a second discharge is effected. This procedure is repeated several times. As a result, the optical fiber 10 is moved by a length indicated by $l_1$ in FIG. 2(a) and about 2 mm of the tip of the thin coating layer 12 is removed by a length to expose the bare fiber 11 as shown in FIG. 2(b).

Figure 2C:
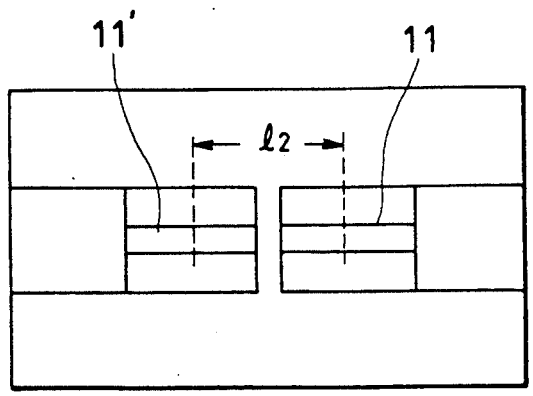

(4) Two bare optical fibers 11 that have been exposed by removing the thin coating layer 12 at their ends in the manner described above are set in a direct core viewing fusion splicer as shown in FIG. 2(c). With the end surfaces of the two fibers 11 being placed face-to-face, they are brought into axial alignment by movement in both the X- and Y-directions.

Since the thin coating layer 12 has been removed from the tip of each bare fiber 11, light is transmitted by the latter and the detection lines for the circumference and horizontal level of the core 11' are carefully observed within the range of $l_2$, to insure that the core of one fiber is in axial alignment with the core of the other fiber.

Figure 2D:
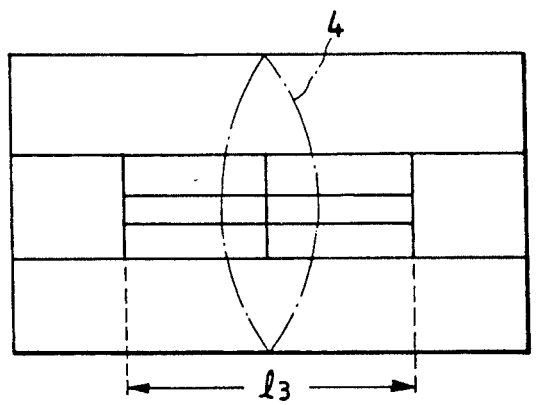
Figure 2E:
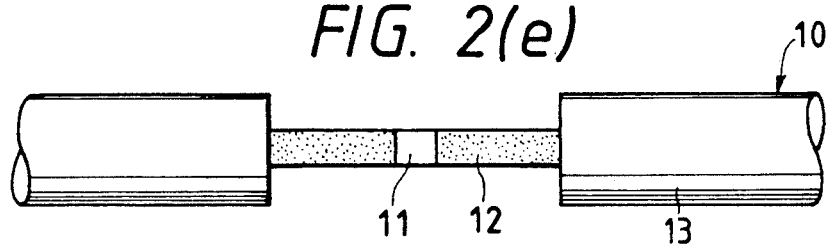
Figure 3A:
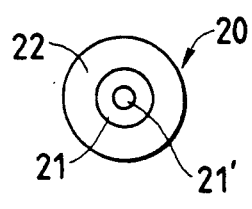
FIG. 3(a) is a cross-sectional view of a conventional optical fiber.
Figure 3B:
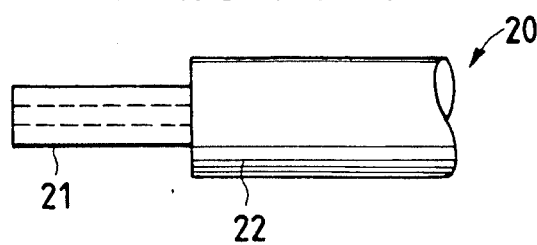
FIG. 3(b) is a side view showing the optical fiber of FIG. 3(a)
Figure 4A:
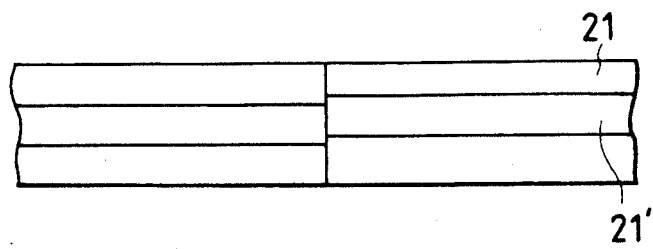
FIGS. 4(a) and 4(b) reveal how cores of two optical fibers can and cannot effectively joined, respectively.
Figure 4B:
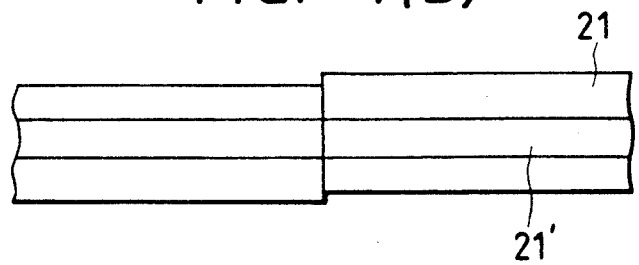
Figure 5A:
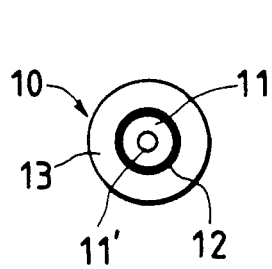
FIG. 5(a) is a cross-sectional view of an optical fiber having a carbon-based thin coating.
Figure 5B:
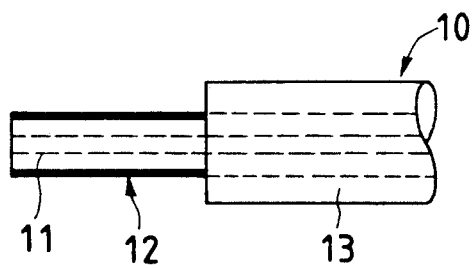
FIG. 5(b) is a side view showing the optical fiber of FIG. 5(b)
Figure 6A:
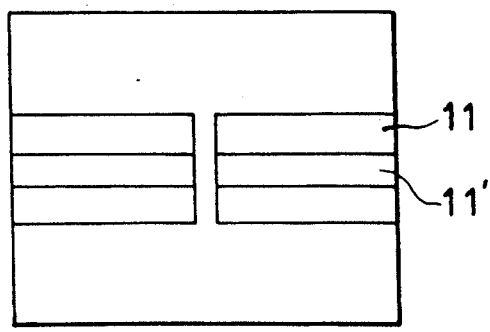
FIGS. 6(a) and 6(b) depict how cores of two optical fibers can and cannot be brought into axial alignment, respectively, by means of a direct core viewing fusion splicer.
Figure 6B:
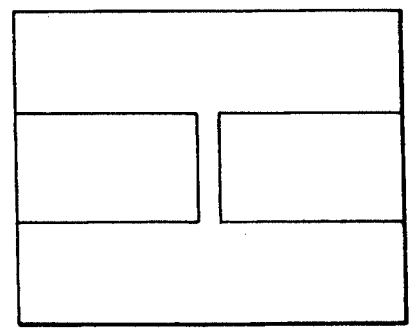

(5) When complete alignment is attained, the end surfaces of the two bare fibers II are brought into contact with each other as shown in FIG. 2(d) and the heat of an electric arc discharge 4 is applied to fuse the two bare fibers 11 together. In order to fuse the bare fibers 11, they must be heated to a temperature of 1800–2000° C. To insure that the thin coating layers 12 that have not been stripped away will not be affected by the resulting heat, a clearance of about 4 mm is necessary as indicated by $l_3$ in FIG. 2(d).

(6) The joint obtained by splicing the two optical fibers with the respective cores being aligned in the manner described above will be as shown in FIG. 2(e). The central part of the joint which covers about 4 mm includes only the joined bare optical fibers 11 but this is not a problem since that portion will be subsequently covered with a reinforcing sleeve.

Applying the method and apparatus described above, the cores of the respective fibers can be axially aligned by means of a direct core viewing fusion splicer to achieve low-loss connection of the fibers.

A further advantage of the present invention is that the carbon-based coating material will not get into the end surfaces of the optical fibers being joined by fusion so that the resulting joint will incur low transmission loss and have high strength.

What is claimed is:

1. A method for joining two optical fibers each consisting of a bare fiber coated with a thin carbon-based layer with the layer being covered with a jacket, the method comprising the steps of:

removing the jacket from a length of the two optical fibers, thereby exposing the carbon-based layer for the length of the jacket removed;

removing the thin carbon-based layer from a second length less than said length without deteriorating a transmission characteristic of the optical fibers so as to expose the bare fibers;

aligning the bare fibers so that a core of one fiber is aligned with the core of the second fiber; and fusing the two fibers together without ever replacing the thin carbon-based layer.

2. A method as in claim 1, wherein the step of removing the thin layer includes the step of:

applying instantaneous heat at a temperature to a tip of each fiber.

3. A method as in claim 2, wherein the temperature of the instantaneous heat is in the range from 500° C. to 1000° C.

4. A method as in claim 2, wherein the step of removing the thin layer further includes the step of using an electric discharge arc to apply the instantaneous heat.

5. A method as in claim 1, wherein the step of fusing the two fibers together includes the step of using an electric air discharge.

6. A method as in claim 5, wherein the electric air discharge is applied at a temperature in a range from 500° C. to 100° C.

7. A method as in claim 1, further comprising the step of putting a new jacket back on the exposed length of fiber.

8. An apparatus for stripping a carbon-based layer from an optical fiber comprising:
an optical fiber holder;
two electrodes being which an electric arc is generated which strips the carbon-based layer from the optical fiber without damaging a transmission characteristic of the fiber, the arc generating a temperature of 500° to 100° C.;
a power source which applies power to the electrodes; and
means for regulating an intensity of the electric arc produced between the two electrodes.

* * * * *

UNITED STATES PATENT AND TRADEMARK OFFICE
CERTIFICATE OF CORRECTION

PATENT NO. : 5,046,812
DATED : September 10, 1991
INVENTOR(S) : YANAGI, Tooru and ASANO, Yasuo It is certified that error appears in the above-identified patent and that said Letters Patent is hereby corrected as shown below:

Column 5, line 10, change "100" to --1000--.

Column 6, line 4, change "being" to --between--; and
line 8, change "100" to --1000--.

Signed and Sealed this

Fifteenth Day of March, 1994

*Attest:*

BRUCE LEHMAN

*Attesting Officer*     *Commissioner of Patents and Trademarks*